Patented Feb. 9, 1932

1,844,015

UNITED STATES PATENT OFFICE

WILHELM LOMMEL AND HEINRICH MÜNZEL, OF WIESDORF, NEAR COLOGNE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

NEW CONDENSATION PRODUCTS FROM PHOSPHINE OXIDES AND PHENOLIC COMPOUNDS

No Drawing. Application filed October 24, 1929, Serial No. 402,326, and in Germany October 31, 1928.

The present invention relates to new condensation products from phosphine oxides and phenolic compounds and to a process of preparing same.

In accordance with the invention new organic phosphorous compounds are obtainable by reacting upon a triaryl phosphine oxide or its addition products with water with a compound exerting phenolic properties, that is a compound containing a hydroxy group linked to an aromatic nucleus which may be further substituted by monovalent substituents in such a manner that its chemical behavior still is that of a true phenol. Such behavior will not be shown by, for instance, the compound of the formula:

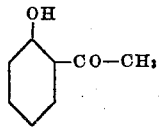

the phenolic properties of which are overlapped by the CO.CH₃ group standing in o-position to the hydroxy group, and this compound, or similar ones, are therefore not intended to be included in the term "a phenolic compound" as mentioned above.

As triaryl phosphine oxides suitable for performing the reaction there may be mentioned, for example, triphenyl-phosphine oxide, tritolyl-phosphine oxides, tri-alpha-naphthyl-phosphine oxide and the like. They can be prepared, for instance, according to the methods described in "Annalen der Chemie" (1885), vol. 229, page 305 or in Comptes rendus, vol. 139, page 675, and it is to be understood that the triaryl phosphine oxides proper, as well as their addition products with water, the so-called triaryl phosphine hydroxides, are intended to be included in our invention.

The reaction may be performed in most different ways. For instance, the reaction components may be caused to react upon one another without any further addition, suitably while heating to a temperature at which at least a part of the mixture liquefies. Or, the reaction may be performed in the presence of a suitable inert organic solvent or diluent, such as methyl alcohol, ethyl alcohol, butyl alcohol, benzene, toluene, xylenes and the like; the reaction takes place in many cases in a very short time and at normal temperature. Also the presence of water will in some cases be advantageous. Generally speaking, we prefer such conditions of working at which the whole or at least part of the reaction mixture is liquefied; this can be accomplished by either heating the solid reaction mixture until liquefaction occurs, or by working in the presence of a suitable solvent as mentioned above. Therefore, all these conditions are understood to be included by the term "in the liquefied state" used hereafter.

In many cases the reaction will be accelerated by applying higher temperatures, say between about 80–200° C., but it may be mentioned that the best temperatures for performing the reaction obviously are to a far reaching extent depending on the nature of the starting materials used.

The working up of the reaction mixture is very simple. When no solvent or diluent has been added and the reaction components have been applied in molecular proportions, the reaction product is directly obtained in a nearly pure state and can be recrystallized from a suitable organic solvent, whereas, when a solvent has been used, the latter may be evaporated, if necessary in vacuo, until the reaction product separates.

The products thus obtainable which probably correspond to the general formula

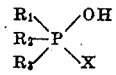

wherein $R_1$, $R_2$ and $R_3$ mean aryl residues and X stands for the residue of the phenolic compound, the oxygen atom of which is linked to the phosphorous atom, generally form colorless to weakly colored compounds, in some cases also oily substances. All the compounds when heated with diluted caustic alkali lyes are split up into the triaryl phosphine oxide or its addition product with water, respectively and the alkali metal salt of the phenolic compound used as starting material.

Below are mentioned, by way of example, a few of the compounds obtainable from triphenyl-phosphine oxide with the phenols indicated:

| | |
|---|---|
| Phenol, melting point | 106° C. |
| m-cresol, melting point | 67° C. |
| o-cresol, melting point | 89–90° C. |
| p-cresol, melting point | 44–45° C. |
| o-chlorophenol, melting point | 105–106° C. |
| p-chlorophenol, melting point | 80–81° C. |
| Thymol, melting point | 67–68° C. |
| Chloro thymol, melting point | 65–66° C. |
| 2.6-dichlorophenol, melting point | 97–98° C. |
| Trichlorophenol, melting point | 70–71° C. |
| Sym.xylenol, melting point | 83–84° C. |
| 6-chloro-2-cresol, melting point | 91–92° C. |
| 3-chloro-4-cresol, melting point | 64–65° C. |
| 4-benzylphenol, melting point | 117° C. |
| p-hydroxybenzoic acid ethyl ester, melting point | 104–105° C. |
| p-nitrophenol, melting point | 107–108° C. |
| pyrocatechinol monoethyl ether, melting point | 93–94° C. |
| resorcinol, melting point | 119–120° C. |
| p-hydroxy benzaldehyde, melting point | 66–67° C. |
| Alpha-naphthol, melting point | 106–107° C. |
| β-naphthol, melting point | 89–90° C. |
| m-hydroxydiethylaniline, melting point | 81–82° C. |
| Tetrahydro-β-naphthol, melting point | About 120° C. |
| Isobutyl phenol, melting point | 73–74° C. |
| 2.4-dichlorophenol, melting point | 54–55° C. |
| 2-isobutyl-4-chlorophenol, melting point | 100–101° C. |
| 6-chloro-3-cresol, melting point | About 45° C. |
| o-benzylphenol, melting point | 88–89° C. |
| 4-benzyl-1-naphthol, melting point | 117–118° C. |
| 1-benzyl-2-naphthol, melting point | 104–105° C. |
| Dibromo-β-naphthol, melting point | 77–78° C. |
| 1-methyl-3-hydroxy-6-isopropylbenzene, oily substance | At normal temperature. |
| β-hydroxyphthalic acid butyl ester, oily substance | At normal temperature. |

The following examples illustrate our invention without restricting it thereto.

*Example 1.*—278 parts by weight of triphenylphosphine oxide are stirred together with 184 parts by weight of p-benzylphenol at 100° C. until solution results. The condensation product is crystallized from a mixture of toluene and benzine. Its melting point is 115° C.

*Example 2.*—320 parts by weight of orthotritolylphosphine oxide are stirred together with 94 parts by weight of phenol for a short time at 150° C. The condensation product melts at 149–150° C.

*Example 3.*—A solution of 278 parts by weight of triphenylphosphine oxide in methyl alcohol is mixed with a solution of 94 parts by weight of phenol in methyl alcohol. After a few minutes the reaction product begins to separate and can be isolated by evaporating. Colorless crystals are thus obtained melting at 106° C.

*Example 4.*—278 parts by weight of triphenylphosphine oxide are mixed with 150 parts by weight of 1-methyl-3-hydroxy-6-isopropyl benzene and the mixture is heated to about 80–100° C. until the whole mass has been liquefied. After cooling the compound of the probable formula.

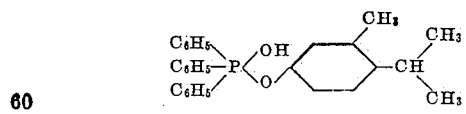

is obtained as a nearly colorless oily product, being split up by diluted caustic soda lye into triphenylphosphine oxide and the sodium salt of 1-methyl-3-hydroxy-6-isopropyl benzene.

We claim:—

1. Process which comprises reacting upon a compound which is predominantly a phenol in its reaction with a triarylphosphine oxide, in a liquefied state.

2. Process which comprises reacting upon phenol being substituted by alkyl groups with triphenylphosphine oxide, in a liquefied state.

3. Process which comprises reacting upon 1-methyl-3-hydroxy-6-isopropyl benzene with triphenylphosphine oxide at a temperature of about 80–100° C.

4. The compounds of the probable general formula

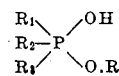

wherein $R_1$, $R_2$ and $R_3$ stand for aryl residues, O—R means the residue of a compound which is predominantly a phenol in its reaction, said products being split up by diluted alkali lyes into a triarylphosphine oxide and an alkali metal salt of a phenol.

5. The compounds of the probable general formula

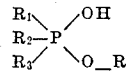

wherein $R_1$, $R_2$ and $R_3$ stand for aryl residues, O—R means the residue of a compound of the benzene or napthalene series which is predominantly a phenol in its reaction, said compounds being colorless to weakly colored products which are split up by diluted caustic alkali lyes into a triarylphosphine oxide and an alkali metal salt of a phenol of the benzene or napthalene series.

6. The compounds of the probable general formula:

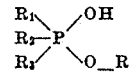

wherein $R_1$, $R_2$ and $R_3$ stand for aryl residues and wherein O—R means the residue of a compound of the benzene series which is predominantly a phenol in its reaction and being substituted by halogen or alkyl groups, said compounds being colorless to weakly colored products which are split up by diluted caustic alkali lyes into a triarylphosphine oxide and an alkali metal phenolate.

7. The compounds of the probable general formula

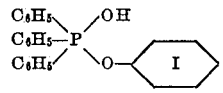

wherein the benzene nucleus marked I is substituted by alkyl groups, said compounds forming colorless to weakly colored products being split up by diluted caustic alkali lyes into triphenylphosphine oxide and an alkali metal salt of an alkyl phenol.

8. The product of the probable formula:

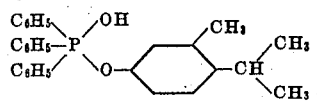

said product forming a colorless oil being split up by diluted caustic soda lye into triphenylphosphine oxide and the sodium salt of 1-methyl-3-hydroxy-6-isopropyl benzene.

9. Process which comprises reacting upon a compound which is predominantly a phenol in its character, of the group consisting of the respective derivatives of the benzene and naphthalene series, with a triarylphosphine oxide, in a liquefied state.

10. Process which comprises reacting upon compounds which are predominantly phenols in their character and possess the general formula R—OH, wherein R represents the benzene nucleus which may be substituted by halogen or alkyl groups, with a triarylphosphine oxide, in a liquefied state.

11. The product of the probable formula:

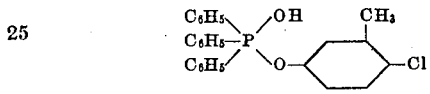

said product forming a crystalline substance melting at about 45° C.

12. The product of the probable formula:

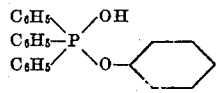

said product forming a crystalline substance melting at 106° C., being split up by heating at the boiling point of the phenol into triphenyl phosphine oxide and phenol and being split up by caustic soda lye into triphenyl phosphine oxide and the sodium salt of phenyl.

In testimony whereof, we affix our signatures.

WILHELM LOMMEL.
HEINRICH MÜNZEL.